United States Patent [19]

Greenhut

[11] Patent Number: 4,884,084

[45] Date of Patent: Nov. 28, 1989

[54] CHART RECORDER

[75] Inventor: Bart E. Greenhut, Beverly Hills, Calif.

[73] Assignee: Leon D. Rosen, Los Angeles, Calif.

[21] Appl. No.: 196,002

[22] Filed: May 19, 1988

[51] Int. Cl.⁴ .......................................... G01D 15/24
[52] U.S. Cl. .................................... 346/136; 346/22; 346/145; 346/139 C
[58] Field of Search ................ 346/22, 33 TP, 139 C, 346/136, 145, 146

[56] References Cited

U.S. PATENT DOCUMENTS

| 1,771,272 | 7/1930 | Pudelko | 346/139 C |
| 4,074,275 | 2/1978 | Stires | 346/33 TP |
| 4,631,552 | 12/1986 | Kobayashi | 346/145 |

Primary Examiner—Clifford C. Shaw
Assistant Examiner—Huan H. Tran
Attorney, Agent, or Firm—Freilich, Hornbaker, Rosen & Fernandez

[57] ABSTRACT

A chart recorder is described, which is especially useful in recording the temperature of a cargo being shipped, which can be constructed at low cost and which provides a tamper-resistant and accurate record. The recorder includes a strip of pressure-markable paper having an inner portion wound into a roll and an outer portion forming a leader. The leader extends past a marking station, a transport that pulls the leader, a storage space within a housing that encloses the rest of the mechanism, and through an opening in the housing with the outer end of the strip attached to the outside of the housing. During recording, the chart is pushed by the transport station into multiple folds lying in the storage space of the housing. The strip can be removed by pulling on its outer end to pull it out of the housing. Pulling of the outer end releases the strip from the marking and transport stations.

18 Claims, 2 Drawing Sheets

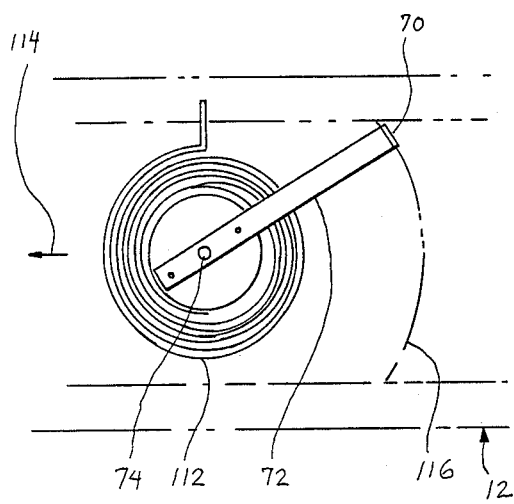
FIG. 4
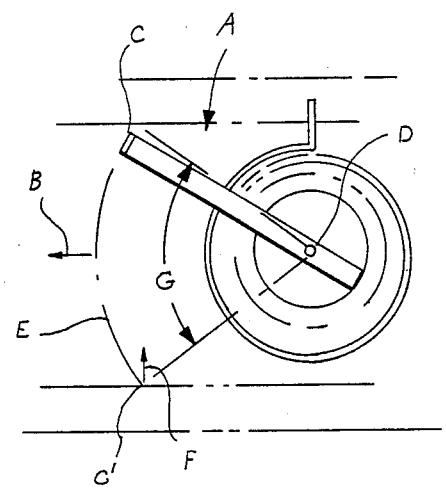
FIG. 5 (PRIOR ART)
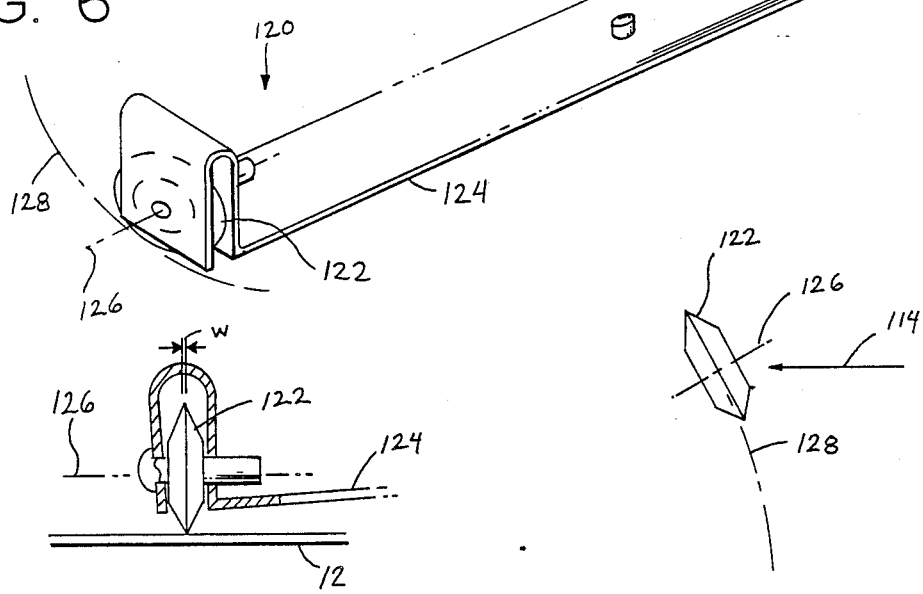
FIG. 6
FIG. 7
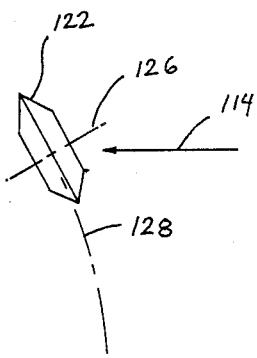
FIG. 8

CHART RECORDER

BACKGROUND OF THE INVENTION

Strip chart recorders are often used to record temperature or other environmental conditions during the transport of cargoes. Prior recorders have included a strip of pressure-markable chart paper having an inner end wound into a supply roll and an outer end forming a leader that extends across a marking station to a takeup reel. A battery-powered motor slowly turns the takeup reel while a stylus at the marking station presses against the strip to mark it. When the shipment is delivered, the person receiving it breaks a seal to open a housing of the chart recorder and removes the chart from the takeup reel. The person can examine the chart to determine whether, for example, the temperature during transport has exceeded a limit which might indicate spoiled goods. The chart is valuable in establishing whether or not the carrier is responsible for certain damages to the goods.

Such prior chart recorders had many disadvantages. One disadvantage is that the chart was subject to a "wrap factor" wherein the first portion of the strip to be recorded upon moved slowly because the windup roll on the takeup reel had a small diameter, while the last portion of the chart moved at a higher rate because the windup roll then had a large diameter. The chart could be printed with variable spaces between time markings to try to account for this variation in chart speed, but the compensation will not be accurate. The "wrap factor" was an important source of error in determining, for example, precisely when the goods were subjected to high temperature or shock. In prior mechanisms the strip chart sometimes was not properly aligned, which resulted in wrinkling of the chart during its rollup. Also, the chart was difficult to review because it tended to curl up due to having been wound onto a small diameter takeup reel.

After the chart is retrieved, the chart recorder may be returned to the manufacturer for installation of another chart for reuse; alternatively, if there is damage to the shipment the mechanism may be retained for possible litigation. Prior chart recorders have often been packaged in reclosable plastic containers having hinged covers, to facilitate access to the chart with minimum possibility of damage to the mechanism during retrieval of the chart, and to facilitate shipment to the manufacturer. If would be desirable if the chart could be retrieved without having to open the housing, as this would permit a lower cost housing to be used and minimize the possibility of damage to the mechanism.

SUMMARY OF THE INVENTION

In accordance with one embodiment of the present invention, a strip chart recorder is provided, which is of low cost construction and which provides a strip chart that is accurate and easily handled. The recorder includes a housing, a strip of paper or other markable chart material in the housing, a marking station in the housing for marking the strip, and a transport in the housing for pulling the strip slowly past the marking station. The strip includes a leader extending through a storage space and out through an opening in the housing. As the transport moves the strip, the strip is stored in loose folds in the storage space within the housing. Afterwards, the outer end of the strip can be pulled to pull the chart out of the housing through the opening.

The marking station can include a writing pad and a stylus which presses the strip against the pad. The writing pad is releasable to move away from the stylus so the inner end of the strip can be easily pulled past the marking station. The outer end of the strip can be coupled to a release device, so that upon pulling of the outer end of the strip the writing pad is automatically released. The chart can have sprocket holes along either edge that are engaged by a sprocket wheel of the transport, and release of the writing pad can also lift the strip off the sprocket wheel.

The stylus has an outer end with a tip that presses against the pressure-markable paper and a pivotally mounted inner end. The stylus can be mounted so the inner end of the stylus lies downpath of the outer end, to avoid "undershoot" of the stylus due to its frictional contact with the strip. The stylus can be a rotatably mounted disc, to avoid both "undershoot" and "overshoot".

The novel features of the invention are set forth with particularity in the appended claims. The invention will be best understood from the following description when read in conjunction with the accompanying drawings.

Figure 1:
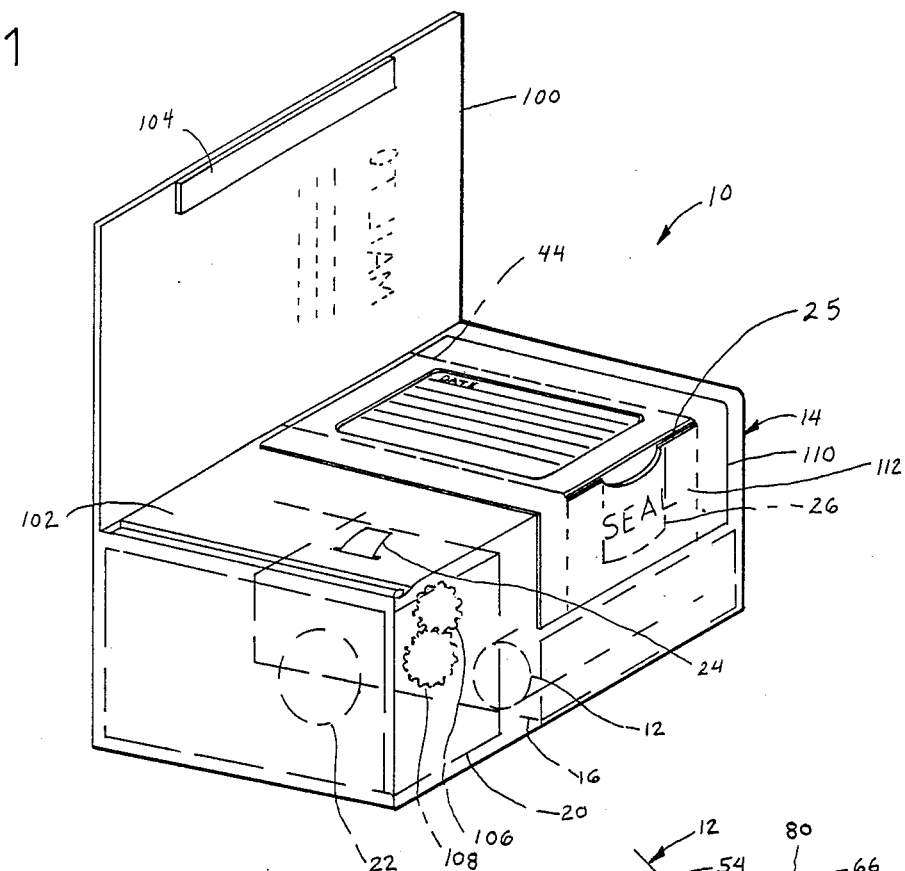
FIG. 1 perspective view of a strip chart recorder constructed in accordance with the present invention, with the top flap of the housing open.

FIG. is a perspective view of a portion of the mechanism of the recorder of FIG. 1.

Figure 3:
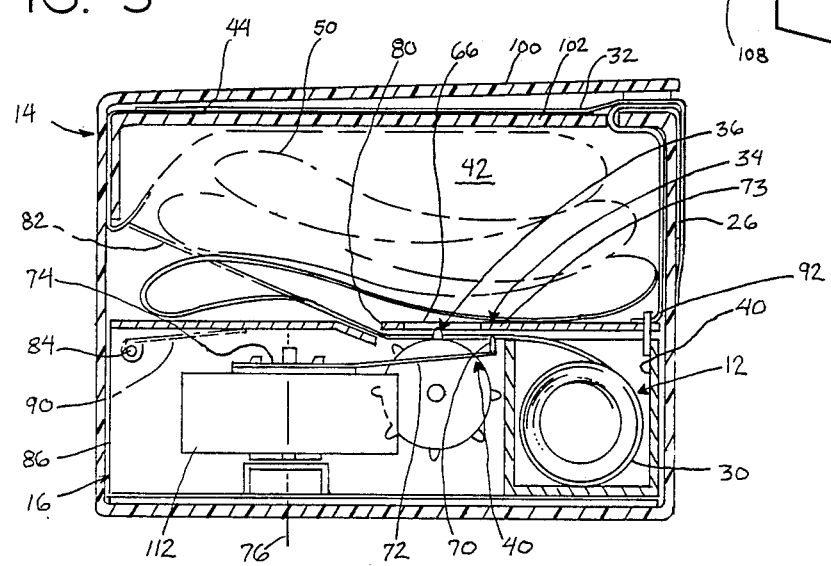

FIG. 3 is a sectional view of the chart recorder of FIG. 1, with the flap closed and the strip chart in its marked position.

FIG. 4 is partial plan view of the marking station of the mechanism of 2, with the writing pad removed.

FIG. 5 is plan view of a prior art marking station.

FIG. 6 perspective view of a portion of a marking apparatus of another embodiment of the invention.

FIG. 7 is a sectional view of the apparatus of FIG. 6.

FIG. 8 is a plan view of a portion of the apparatus of FIG. 6.

DESCRIPTION OF EMBODIMENT

FIG. 1 illustrates a strip chart recorder 10 which includes a strip of pressure-markable paper 12 contained primarily within a housing 14. A mechanism 16 within the housing marks the strip as the strip is slowly moved, to provide a record of an environmental condition such as the temperature. The mechanism is powered by a clockwork 20 within the housing which includes batteries and a clock-like motor 22. The recorder may be used by mounting it in a storage container filled with perishable goods that are shipped, as by truck or other vehicle. At the beginning of shipment, a tab 24 is pulled to begin operation of the clockwork and marking of the strip. When the shipment arrives at its destination, a person who receives it pulls out the strip chart by tearing off a seal 25 and pulling on an outer end 26 of the chart. Assuming the chart does not indicate any likelihood of damage to the goods and the goods appear in acceptable condition, the chart recorder 10, minus the chart that has been removed, is returned to the manufacturer for reuse. A mailing label 28 on the top, and a "Postage Guaranteed" marking, allows the person to return the recorder by dropping it in a mailbox. Reuse requires readying the clockwork, installing a new chart in the mechanism 16, and checking out and resealing the apparatus.

As illustrated in FIG. 3, the chart 12 includes an inner portion that is originally in the form of a supply roll 30 in a roll holding space 40, and an outer portion in the form of a leader 32. Initially, the leader extends from the supply roll past a marking station 34 where the chart is marked, and past a transport station 36 which pulls the chart out of the roll holding space to move past the marking station. The leader further extends through a substantially closed storage space 42, and through a constricted opening 44 to the outside of the housing. The outer end 26 of the leader is fastened to the outside of the housing. The storage space 42 is devoid of a takeup reel or the like. Instead, during operation the marked portion of the chart is stored in the space 42 in the form of multiple loose folds 50. As shown in FIG. 3, the folds 50 lie in nonparallel curves, rather than closely adjacent parallel planes like the folds in fanfold paper that has perforations at the folds. When the shipment is received, the person who receives it pulls on the outer end 26 of the leader to pull the chart completely out of the housing through the opening 44. It is not necessary for the person to open the housing because he does not require access to the marking and transport mechanism therein.

Figure 2:
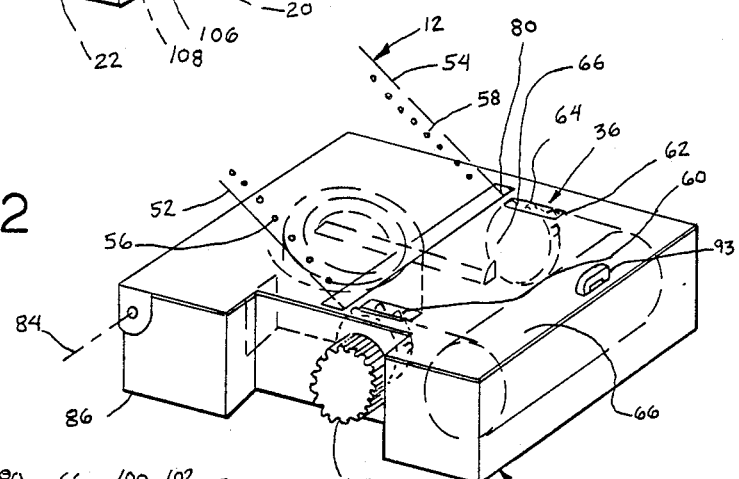

The chart 12 (FIG. 2) has opposite side or edge portions 52, 54, and has a row of sprocket holes 56, 58 along each edge portion. The transport 36 includes a pair of sprocket wheels 60, 62 having sprockets 64 that extend through the sprocket holes of the chart. This assures that the chart moves at a predetermined rate governed by the clockwork. The chart is prevented from lifting off the sprockets by a pad 66 that is usually positioned closely against the chart on a side of it opposite the sprocket wheels. The marking station 34 includes a stylus device that includes a stylus 70 (FIG. 3) on a marking arm 72. The stylus 70 is pressed towards the chart and a writing pad portion 73, the pad portion 73 being part of the pad 66 that holds the chart engaged with the sprocket wheels. The stylus lies on the outer end of the marking arm 72, whose inner end 74 is pivotally mounted about an axis 76. The pad 66 has an opening 80 through which the chart extends to enter the storage space 42. Initially, the leader includes a strip middle portion that extends along the path indicated at 82, before much of the chart is marked and stored in a fan-folded arrangement in the storage space.

After the chart has been marked, and when it is to be removed, it is desirable to release the chart from both the marking stylus 70 and the sprocket wheels 60, 62 of the transport. Releasing the chart from the transport is necessary to prevent tearing it at the sprocket holes, while releasing the chart from the stylus is desirable to avoid unnecessary and possibly misleading marking of the inner portion of the chart as well as to avoid tearing of the chart by the stylus. To enable release of the chart, the pad 66 is pivotally mounted about an axis 84 on a mechanism frame 86. A spring 90 urges the chart to pivot up away from the sprocket wheel and stylus, while a release device 92 which extends through a slot in a bracket 93, prevents upward pivoting of the pad. The release device 92 extends outwardly through the housing 14 to the outer end 26 of the leader which lies outside the housing, and is fastened to the leader outer end. To remove the chart, a person grips the outer end 26 of the leader and pulls it away from the housing, thereby pulling the release member 92 to release the pad 66. As the pad 66 "pops" open from its down position, the portion of the chart extending through the opening 80 in the pad, and which previously lay in a held-down position, is pulled up away from the sprocket wheels. The person can continue to pull on the chart, to pull all of it, including the inner portion lying in the roll holding space 40, out of the housing.

The housing 14 can be constructed of cardboard. The top of the box includes a pair of flaps 100, 102 that can be bent open to install the clockwork 20 and the chart transport and marking mechanism 16. Then the flaps can be lowered to the position shown in FIG. 3, and the upper flap 100 sealed closed by a strip of adhesive 104. The adhesive will tear the surface of the cardboard when opened, to indicate that opening has occurred. The flaps lie closely facewise adjacent to one another to leave a narrow opening 44 between them through which the chart extends. The flaps act as a brake or clutch that resists movement of the chart through the opening 44 at the time when the chart is being marked and the transport is moving the chart into multiple folds in the storage space 42. Still, the flaps permit the chart to be pulled through the opening 44 when the chart is later to be removed.

To prepare the chart recorder, the mechanism 16 is mounted to the bottom of the housing and the clockwork 20 is also mounted in the housing, with an output gear 106 (FIG. 1) on the outside of the clockwork engaged with an input gear 108 on the mechanism 16 to drive it. With the chart leader extending out of the housing, the lower flap 102 is lowered, and the chart leader 44 is laid on top of it. The outer end 26 of the leader is fastened to the release member 92. A sealing device 110 is fastened to the flap 102 and housing front, over the outer end 26 of the chart leader. A seal portion 112 of the seal must be torn off by a receiver of the shipment, to gain access to the outer end 26 of the chart leader. Then a protective strip over the adhesive 104 on the top flap 100 is removed, and the top flap is lowered to seal the housing closed. The recorder is then shipped to a user. Until the recorder is returned to the factory for reuse, no one needs to open the housing.

The storage of the chart in a fan-folded arrangement in the storage space 42 (which is devoid of a takeup reel or the like) has several advantages. First, the fan-folded chart is easier to handle than one which has been wound on a small diameter takeup reel (such small diameter takeup reels have previously been used to wind up a chart). The chart avoids the "wrap factor" whereby a chart wound onto a takeup reel moves continuously faster as the roll of paper on the takeup reel grows in diameter, for clockworks that turns the takeup reel at a predetermined constant angular rate. Applicant avoids the need to compensate for such uneven speed, which makes the charts more economical to make and allows a precise drive such as a sprocket drive to be used which results in greater accuracy in chart movement. Also, the sprocket drive avoids wrinkling of the chart which has often occurred in prior mechanisms which used a takeup reel. The present arrangement also provides enhanced security because neither the shipper nor the receiver needs to open the housing to retrieve the chart, so there is less possibility of tampering with the recorder. The fact that the person receiving the shipment does not have to manipulate the mechanism to retrieve the chart, helps avoid damage to the mechanism, and also avoids the need for a housing sturdy enough that it can be opened and then reliably closed for immediate shipment back to the manufacturer.

The chart recorder includes a marking apparatus 110 which includes the stylus 70 and marking arm 72. The apparatus is designed to move the stylus sidewardly according to the environmental temperature, and includes a bimetallic spring 112. As is well known, changes in temperature cause the spring to move into a tighter or looser spiral resulting in pivoting of the arm about the axis 76, which causes the outer end of the arm at the stylus 70 to move across the width of the chart. Prior art marking apparatus of the type shown in FIG. 5, which includes a stylus that presses against a moveable strip chart, placed the outer end of the arm which holds the stylus, downpath from the inner end of the arm where it pivots. This has the disadvantage that friction between the stylus and the moving chart tends to move the stylus toward the center of the chart.

FIG. 5 illustrates a prior art marking apparatus A wherein, with the chart moving in a downpath direction B, the stylus or outer end C of the apparatus lay downpath from the pivotally mounted inner end D. The stylus moves along an arc E as the temperature changes. When the stylus lies at the center of the chart, so it lies directly downpath from its inner end, friction does not tend to move the stylus along its arc. However, when the stylus lies away from the center of the chart, as at the position C', friction of the chart moving in the direction B results in a component of the friction force urging the stylus in the sideward direction F back toward the center of the chart. This causes "undershoot", which is a recording that is less than actual deviation from the center. In a chart where the temperature extremes at the opposite sides of the markable chart portion are 50°0 F. apart, and the arm moves along an angle G of about 60° between its extreme positions, the temperature error at the opposite sides of the chart commonly range up to 2°0 F. or more. This "undershoot" is significant.

As shown in FIG. 4, applicant mounts the inner end 74 of the marking arm 72 so it lies downpath from the stylus 70 at the outer end of the arm. The chart moves in the downpath direction 114. The stylus 70 can move along a curve 116 between opposite sides of the chart 12. Where the paper moves "into" the stylus as in FIG. 4, there is a divergent tendency that urges the stylus near one edge of the paper to move further toward that edge. However, applicant finds that in actuality the stylus tends not to overshoot as much as it undershoots in the prior art. Applicant believes that the bimetallic spring 112 has a hysteresis which reduces the amount by which it tends to move to one side of the chart as it approaches that side. Moving the chart "into" the stylus tends to compensate for such hysteresis, so that during recording of extremes of temperature (which are usually the most significant readings) the inaccuracy is less than in the prior art.

FIGS. 6 and 7 illustrate another marking apparatus 120 which greatly reduces the sideward component of friction between the stylus and paper, to substantially eliminate "undershoot" or "overshoot". The apparatus includes a stylus 122 in the form of a disc or roller, rotatably mounted on the outer end of a marking arm 124. The disc or roller stylus 122 can rotate about an axis 126 that is substantially perpendicular to the path 128 of the stylus as the arm pivots. This is accomplished by orienting the stylus axis 126 approximately perpendicular and coincident (i.e., it extends substantially through) with the axis 74 about which the inner end of the arm pivots. The stylus is formed with a narrow circular edge 130 to concentrate the force on the chart 12 to mark it. The width of the edge is less than one-tenth the radius of the edge. The stylus is fixed to a shaft that can rotate on a folded over end portion 124 of the arm. The folded over end portion forms substantially parallel sides on which a roller shaft is mounted.

FIG. 8 shows the stylus 122 lying in an extreme sideward position wherein axis 126 of the stylus 122 is angled about 30° from the direction 114 of chart movement. Any component of friction with the chart tending to cause pivoting of the marking arm and consequent movement of the stylus along its path 128, results in rotation of the stylus rather than pivoting of the marking arm. In fact, near its extreme positions, the stylus 122 may roll slightly at every advancement of the chart. Although a ball could be used which can rotate about any axis, the disc stylus provides more concentrated marking force and less friction than such a ball.

Thus, the invention provides a strip chart recorder which is of simple and economical construction and that produces a marked chart that is easy to withdraw without the need to open the housing and thereafter easy to read, and wherein a marking stylus more accurately marks the chart. The housing has a chart storage space that is devoid of a windup reel, and which contains the leader of the chart at the beginning of marking, the chart being stored in a fan-folded arrangement within the storage space during marking. The outer end of the leader can extend through a narrow opening in the housing, so that the person receiving a shipment can remove the chart by pulling on the outer end without the need to open the housing. The chart can be released from a pad which holds it against the stylus and sprocket wheels by a release device that is operated to release the pad when the outer end of the chart is pulled. The marking apparatus can include a stylus mounted on the outer end of an arm whose inner end is pivotally mounted about an axis located downpath from the stylus, which avoids "undershoot" of the stylus during recording. The stylus can have a circular periphery and be rotatably mounted on the marking arm, to very effectively avoid "undershoot" or "overshoot".

Although particular embodiments of the invention have been described and illustrated herein, it is recognized that modifications and variations may readily occur to those skilled in the art and consequently it is intended to cover such modifications and equivalents.

What is claimed is:

1. In a chart recorder which includes a housing, a strip of paper or other markable material lying in said housing, a marking station in said housing for establishing a mark on said strip, and a transport in said housing for pulling said strip in a downpath direction slowly past said marking station, the improvement wherein:
    said strip includes a supply roll with a leader;
    said housing includes an opening and a substantially closed storage space lying downpath of said transport for receiving said strip after it has been marked, said storage space being devoid of a roll for rolling up said strip, whereby to allow said strip to be stored in loose folds;
    said leader of said strip has an outer end extending through said opening and held to said housing, whereby the stored strip can be removed by pulling it out of said housing through said opening.

2. The improvement described in claim 1 wherein:

said marking station includes a pad and a stylus which presses the strip against the pad, said pad being releasable to move away from said stylus to release the strip from being pressed between the stylus and pad, and including a release device coupled to said pad and operable to release said pad to move away from said stylus;

said outer end of said strip is coupled to said release device to operate it to release said pad when said strip outer end is pulled to remove the stored strip.

3. The improvement described in claim 1 wherein:
said housing comprises a cardboard-type box having a pair of flaps that lie facewise adjacent to each other, said strip outer end lies between said flaps, whereby the flaps serve as a clutch preventing the strip from moving out of the box until the outer end of the strip is pulled out.

4. The improvement described in claim 1 wherein:
said strip is marked along a portion of its length, said marked portion lying in a plurality of loose folds in said storage space.

5. A chart recorder comprising:
a substantially closed housing having a strip-passing opening:
a mechanism lying in said housing which includes a marking station and a transport for moving said strip past said marking station, said housing having a strip storage space lying between said mechanism and said opening;
a strip of markable material having an inner portion lying in said housing up-path of said marking station, an outer portion lYing outside said housing, and a middle portion extending through said marking station and transport and through said storage space to said outer portion which lies outside said housing, whereby to allow the marked strip portion to be stored in said storage space and allow strip removal by pulling on said strip outer end.

6. The recorder described in claim 5 wherein:
said strip has opposite edge portions and a row of sprocket holes along at least one of said edge portions;
said transport includes a sprocket wheel having sprockets engaged with said sprocket holes, and a pad which can lie in a down position wherein it holds said strip in a held-down position at which the sprocket holes in the strip lie engaged with said sprocket wheel, said pad being moveably mounted to allow pad movement to a release position away from said down position, and spring means urging said pad toward said release position, and said transport includes a release member moveable from outside said housing to release said pad from said down position.

7. In a chart recorder which includes a housing, a strip of paper or other markable material lying in said housing, a marking station in said housing for establishing a mark on said strip, and a transport in said housing for pulling said strip in a downpath direction slowly past said station, the improvement wherein:
said strip includes an inner portion and a leader, said strip including opposite edge portions with sprocket holes therealong;
said transport including a sprocket wheel having sprockets;
said marking station including a writing pad and a stylus biased toward said pad;
said housing includes walls forming a chamber with an opening and a storage space between said transport and said opening;
said strip extends through said marking station between said stylus and pad, past said transport with said sprockets extending through said sprocket holes, and through said storage space, with said leader extending through said opening, said storage space being large enough to hold said strip in multiple folds therein.

8. The improvement described in claim 7 wherein:
said writing pad has a portion which holds said strip engaged with said sprocket wheel, said pad being moveable in a predetermined direction to a release position away from said sprocket wheel, said pad having a slot in said portion through which said strip extends, whereby moving of said pad o said release position pulls the strip off said sprocket wheel.

9. The improvement described in claim 8 including:
a spring device biasing said pad toward said release position, and a release device which holds said pad from moving to said release position, said release device including a member coupled to an end of said leader which lies outside said housing, said release device releasing said pad to move to said release position when said member is pulled.

10. A method for operating a strip chart recorder which includes a marking station and a substantially closed housing, comprising:
moving an inner portion of a strip of markable paper past a marking station and into multiple folds in said housing, while an outer portion of the strip extends through an opening in the housing and out of the housing;
pulling said outer portion of said strip and the multiple folds of said inner portion to of said housing.

11. The method described in claim 10 wherein:
said strip has a pair of opposite sides and sprocket holes along said sides, and said step of moving includes turning a sprocket wheel engaged with said sprocket holes while extending said strip through a slot in a pad adjacent to said wheel;
said step of pulling includes releasing said pad to move it away from said sprocket wheel, whereby to release said strip from said sprocket wheel.

12. In a chart recorder which includes a transport that moves a strip of markable material which is marked when pressure is applied thereto without requiring the depositing of material on the strip to mark it, and a marking apparatus which includes a stylus mounted on an arm that has an inner end which can pivot about a first axis to move the stylus along a path to different positions along the width of the strip, the improvement wherein:
said stylus has a substantially circular periphery and is rotatably mounted on said arm to enable said stylus to pivot about a second axis substantially concentric with said circular periphery, said second axis extending substantially perpendicular to and substantially through said first axis.

13. The improvement described in claim 10 wherein:
said arm comprises a strip of metal with an outer end folded over to form substantially parallel sides, said stylus being rotatably mounted on said two substantially parallel sides.

14. A chart marking apparatus for marking an elongated chart which is moved along its length to record a sensed condition, comprising:
  a marking arm having inner and outer portions;
  means responsive to a sensed condition, and means coupled to said inner portion of said arm, for pivoting said arm substantially about a first axis to move said outer portion of said arm along the width of said chart;
  roller rotatably mounted on said outer portion of said marking arm about a second axis which extends approximately perpendicular to and through said first axis.

15. The apparatus described in claim 14 wherein:
  said roller has a periphery forming a narrow edge.

16. In a chart recorder which includes a housing, a strip of paper or other markable material lying in said housing, a marking station in said housing for establishing a mark on said strip, and a transport in said housing for pulling said strip in a downpath direction slowly past said marking station, the improvement wherein:
  said housing includes a substantially closed storage space lying downpath of said transport for receiving said strip after it has been marked, said storage space being devoid of a roll for rolling up said strip;
  said strip including a plurality of turns forming said supply roll and located uppath from said transport, and forming a plurality of loose folds on said storage space downpath from said transport.

17. The improvement described in claim 16 wherein: said folds lie in largely spaced curves.

18. The improvement described in claim 16 wherein: said strip has a leader fixed to said housing.

* * * * *